United States Patent [19]

Brown, Jr.

[11] Patent Number: 4,704,867
[45] Date of Patent: Nov. 10, 1987

[54] HYDRAULIC BRAKE BOOSTER WITH CAM AND LEVER RATIO CHANGER

[75] Inventor: Arthur K. Brown, Jr., South Bend, Ind.

[73] Assignee: Allied Corporation, Morristown, N.J.

[21] Appl. No.: 806,300

[22] Filed: Dec. 9, 1985

[51] Int. Cl.$^4$ ............................................. B60T 13/20
[52] U.S. Cl. ........................................ 60/554; 60/594; 91/369 B; 91/382
[58] Field of Search ...................... 60/554, 547.1, 548, 60/552, 553, 562, 594; 91/369 B, 382

[56] References Cited

U.S. PATENT DOCUMENTS

| | | | |
|---|---|---|---|
| 4,200,001 | 4/1980 | Kytta | 91/369 B |
| 4,283,992 | 8/1981 | Wilson | 91/369 B |
| 4,416,188 | 11/1983 | Katagiri | 91/369 B |
| 4,490,977 | 1/1985 | Fulmer | 60/554 |
| 4,548,037 | 10/1985 | Farr | 91/369 B |

Primary Examiner—Abraham Hershkovitz
Attorney, Agent, or Firm—Larry J. Palguta; Ken C. Decker

[57] ABSTRACT

The brake booster (12) includes a housing (30) with at least one piston (38) disposed in a bore (32) between a pressure chamber (42) and a work chamber (76). The piston (38) is disposed adjacent a valve housing (79) containing therein a valve assembly (80) and the valve assembly (80) is connected to an input assembly (72) at an end of the valve housing (79). The piston (38) includes a cam surface (78) engaged by a lever (17), the lever (17) abutting an actuator part (81) biased by a resilient spring (83) toward the lever (17). Actuation of the booster (12) effects a greater displacement of the piston (38) than the input assembly (72) and valve housing (79) because of the engagement of the lever with the cam surface (78) of the piston (38).

14 Claims, 3 Drawing Figures

HYDRAULIC BRAKE BOOSTER WITH CAM AND LEVER RATIO CHANGER

The present invention relates to a hydraulic brake booster which provides the advantage of a shortened brake pedal travel stroke which effects a full stroke displacement of the piston by means of a cam and lever ratio changer.

The present invention relates to a booster commonly referred to in the state of the art as a "full power" brake booster, such as those disclosed in copending applications Ser. Nos. 793,015 now U.S. Pat. 4,665,701; 793,021; and 793,022 pending. In a full power brake booster, an accumulator is charged with fluid pressure for selective use in providing a power assist. The accumulator is communicated to a booster housing and a valve assembly is operable to control communication of fluid pressure from the accumulator to a power chamber wherein the fluid pressure acts against at least one piston to communicate fluid pressure from the housing to a brake circuit. The valve assembly is actuated by an input assembly which controls operation of the valve assembly. It is preferable to provide a hydraulic brake booster which provides for a small movement or travel stroke of the brake pedal which results in a greater movement of the pistos, the brake pedal not following the full movement of the pistons and therefore not providing a full stroke travel of the brake pedal. It is also preferable that in case there is a failure in the supply of fluid pressure to the booster, that the brake pedal experience a full stroke travel as the vehicle operator operates manually the braking system of the vehicle. The longer brake pedal stroke during a fluid pressure power failure is preferable because this provides the vehicle operator with the ability to effect the necessary brake fluid pressure to stop the vehicle in the required distance with less force having to be applied via the brake pedal. Thus, the mechanical advantage of a long brake pedal stroke during manual operation of the brake system is a desirable objective. It is also preferable to achieve the above by means of a hydraulic brake booster having a single bore assembly, the single bore assembly permitting the utilization of current equipment and greatly reducing the cost thereof.

The present invention provides a brake booster having a housing with at least one outlet communicating with a brake, a piston movably disposed within the housing between a pressure chamber and a work chamber, an input assembly to control communication of fluid pressure to the work chamber wherein the fluid pressure biases the piston to move from a rest position to a braking position, a valve assembly operable in response to movement of the input assembly, and an inlet formed by the housing to communicate fluid pressure to the valve assembly, characterized in that the brake booster comprises a valve housing disposed between said piston and input assembly and the valve assembly disposed within the valve housing, the valve housing including an actuator part, the piston including a cam, and the booster including lever means disposed between the cam and actuator part, displacement of the input assembly effecting operation of the valve assembly and an increased displacement of the piston by means of the lever means and cam.

The brake booster includes a first embodiment which has a resilient spring disposed between the actuator part and the valve housing, and a second embodiment wherein the resilient spring is disposed between the cam and primary piston. The resilient spring, in the absence of fluid pressure supplied during normal power operation, will not effect movement of the lever and compresses to render the lever and cam surface ineffective during manual operation of the brake system.

The invention will now be described with reference to the accompanying drawings, which illustrate embodiments of the invention.

Figure 1:
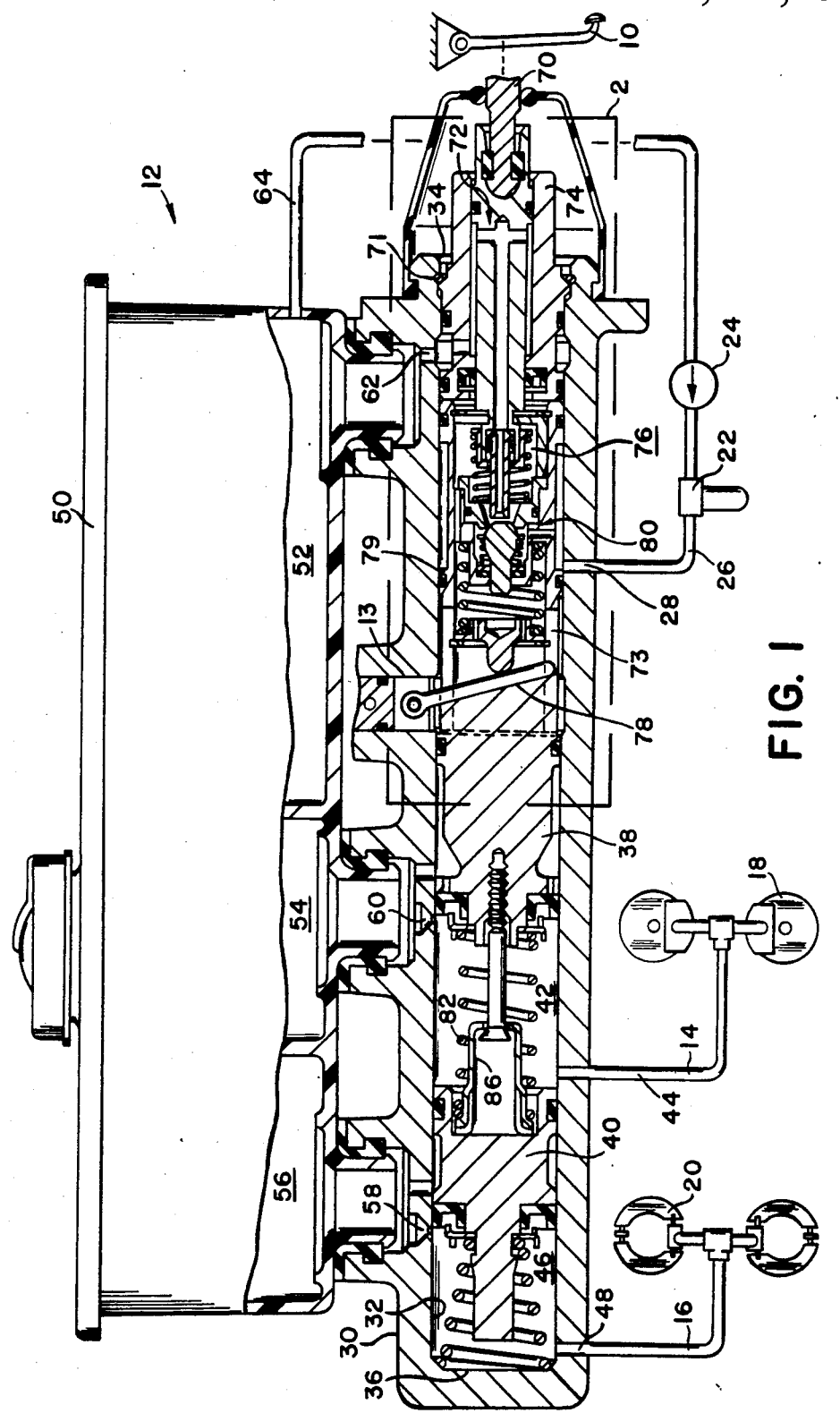
FIG. 1 is a schematic view of a brake system showing the brake booster of the present invention in cross section.

A brake system includes a brake pedal 10 connected to a brake booster 12. The brake booster 12 includes conduits 14 and 16 communicating, respectively, with brakes 18 and 20 associated with the vehicle wheels. A fluid pressure source or accumulator 22 is maintained at a predetermined fluid pressure level by a pump 24 and the accumulator 22 is in communication with brake booster 12 via a conduit 26 and brake booster inlet 28. The brake system operates in the conventional manner in that the movement of the brake pedal to an actuated or braking position results in the brake booster 12 communicating fluid pressure to the brakes 18 and 20.

Brake booster 12 includes a housing 30 with a bore 32 leading from an open end 34 to a bottom wall 36. A primary piston 38 cooperates with the secondary piston 40 and housing 30 to define a primary pressure chamber 42 therebetween which communicates via a first outlet 44 with the conduit 14. The secondary piston 40 cooperates with housing 30 to define a secondary pressure chamber 46 at the bottom wall in communication with the conduit 16 via a second outlet 48.

A reservoir 50 includes three chambers 52, 54, and 56. The chamber 56 communicates via port 58 with secondary pressure chamber 46 when the secondary piston 40 is in a rest position, as shown. The chamber 54 communicates via port 60 with primary pressure chamber 42 when the primary piston 30 is in a rest position. The chamber 52 communicates with the bore 32 via port 62 and also communicates with the pump 24 via conduit 64.

An input member 70 connects with brake pedal 10 and cooperates with a plug 74 to close the open end 34 of bore 32. A snap ring 71 retains the plug within bore 32, and input assembly 72 cooperates with plug 74 to define a work chamber 76 within bore 32 and to the right side of primary piston 38. Primary piston 38 is provided with a rear cam surface 78 oriented toward the work chamber and received in end slots 73 of a valve housing 79. The valve housing 79 receives therein a valve assembly 80 for cooperation with the input assembly in a manner hereinafter described. A spring 82 between the pistons 38 and 40 biases the primary piston 38 to its rest position as shown. A spring 84 between end wall 36 and secondary piston 40 biases piston 40 to its rest position abutting a top hat assembly 86 secured to primary piston 38.

Figure 2:
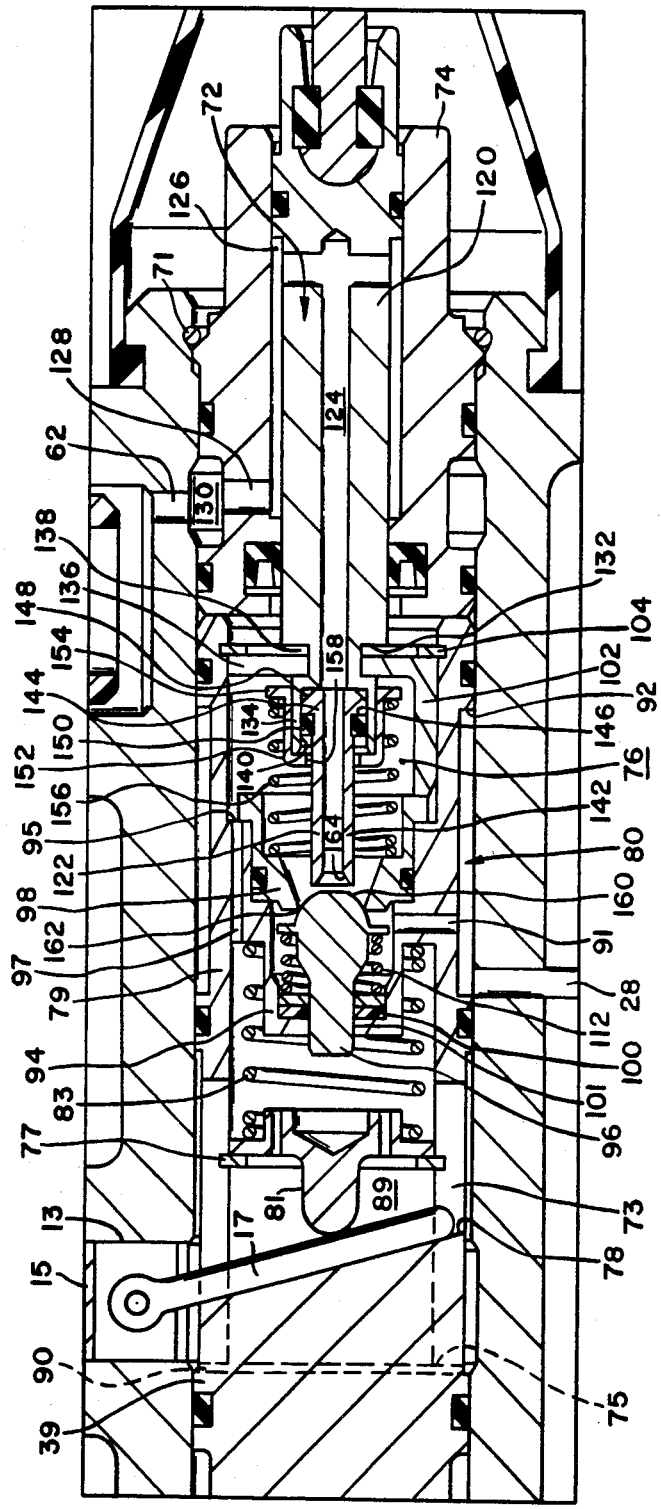
FIG. 2 is an enlarged view of the circumscribed portion 2 in FIG. 1.

Turning to FIG. 2, the primary piston 38 defines the rear cam surface 78 which extends into slots 73 in valve housing 79. Valve housing 79 extends to end 75 disposed a small distance or gap 90 from flange 39 of the primary piston 38. Valve housing 79 has snap ring 77 providing a stop for actuator part 81 biased by spring 83 seated against sealing ring 94. Booster 12 includes radial passage 13 with plug 15 and lever 17 inserted therein. Lever 17 is engaged on one side by actuator part 81 disposed along the center line of bore 32 and engaged on the other side by cam surface 78. A clearance 92 of valve housing 79 provides for fluid communication from conduit 28 to opening 91 and valve assembly 80. Valve assembly 80 within valve housing 79 includes the inner housing 94 with an opening 101 and seal 100 receiving a valve member 96 and a valve seat 98 engages the end of valve member 96 in the illustrated rest position. A filter (not illustrated) may be disposed between inner housing 94 and valve seat 98 so that all of the fluid communicated through opening 91 is filtered to remove contaminants therefrom. In order to retain valve assembly 80 within valve housing 79, a sleeve 102 engages valve seat 98 and a snap ring 104 opposes withdrawal of the sleeve. A spring 112 extends between inner housing 94 and valve member 96 to bias valve member 96 into engagement with valve seat 98. With valve member 96 engaging valve seat 98, fluid pressure communicated through opening 91 is trapped on the left side of valve seat 98. The effective area for valve member 96 is equal to the diameter of the valve member extending through the opening 101 so that the valve member is substantially pressure balanced.

The input assembly 72 includes an input rod 120 and an end projection 122. The rod and projection include axial passages 124 leading from work chamber 76 to a plug clearance 126, which in turn communicates with an opening 128 and clearance 130 in communication with port 62 for the reservoir chamber 52. Therefore, in the rest position of the input assembly 72, work chamber 76 is in communication with reservoir chamber 52. The input rod 120 forms a groove 132 adjacent an enlarged head 134. The sleeve 102 is slotted at 136 to permit transverse attachment of sleeve 102 to input rod 120. With the sleeve in the groove 132, an axial clearance or gap 138 is formed between the sleeve and input rod to permit slight relative axial movement therebetween. The enlarged head 134 defines a recess 140 leading to the passage 124 and end projection 122 is disposed within recess 140. End projection 122 forms a small diameter end portion 142 adjacent valve seat 98 and at the opposite end a large diameter portion 144. The large diameter portion separates a groove 146 on the end projection from a tapered edge 148. The groove 146 receives a seal 150. The seal 150 engages the wall of recess 140 to yieldably dispose end projection 122 coaxial with input rod 120. A collar 152 is fitted over the enlarged head 134. The collar 152 forms a flange 154 acting as a spring rest for a spring 156. The spring extends from valve seat 98 to collar 152 to bias enlarged head 134 to a rest position adjacent sleeve 102 and in spaced relation to the valve member 96. The collar forms an opening 158 receiving the end projection within a radial clearance between the wall of opening 158 and the end projection. The diameter of collar flange 154 is larger than the width of the slot 136 so that the sleeve 102 is prevented from separating from rod 120 so long as the collar 152 remains fitted to the enlarged head. The basic construction of valve assembly 80 is the same as disclosed in U.S. Pat. No. 4,514,981 owned by the same assignee as herein and incorporated by reference.

Valve member 96 is engageable with a part spherical edge 162 on valve seat 98. The left end 164 of projection 122 is engageable with spherical end 160 during braking to close passage 124 and move spherical end 160 away from the edge 162. In order to permit end 164 to seek alignment with ball 160, the end projection 122 is capable of pivoting relative to the head 134.

During a brake application, pedal 10 is depressed by the vehicle operator to move input assembly 72 toward the primary piston 38. The initial engagement of the vehicle operator's foot with the brake pedal results in a very small initial displacement which causes end projection 122 to engage spherical end 160 to seek a sealing engagement therewith and close communication between work chamber 76 and passage 124. Further slight movement of the input assembly moves spherical end 160 away from edge 162 so that fluid pressure from accumulator 22 is communicated to work chamber 76 via conduit 26, inlet 28, clearance 92, opening 91, and edge 162. The initial surge of fluid pressure through valve seat 98 also results in fluid pressure flowing through shoulder 95 via passage 97 to variable chamber 89. The increased fluid pressure acts against actuator part 81 and cam surface 78 to move the primary piston to the left against spring 82 and secondary piston 40. The pistons are displaced past their respective compensation ports and compresses fluid within chambers 42 and 46 to displace fluid through the respective brake lines to the brakes and place the brakes in a ready position for the commencement of braking. As the primary piston 38 moves to the left, the primary piston moves a greater distance than the input assembly 72 because the lever 17 engages the radially outer portion of cam surface 78. As actuator part 81 moves to the left, it displaces the lever 17 that cams the primary piston 38 an increased distance. During power operation, the distance or gap 90 between the primary piston 38 and end 75 of housing 79 increases due to the changing displacement ratio effected by the lever and cam surface. When a predetermined fluid pressure level is reached in work chamber 76 corresponding to an associated brake pedal input force, the primary piston moves slightly relative to the end projection 122 to re-engage the spherical end 160 with edge 162 to prevent further buildup of fluid pressure in the work chamber. Further braking separates the spherical end 160 from valve seat 98 to increase the communication of fluid pressure to the work chamber. Upon termination of braking, spring 156 biases the enlarged head 134 to abut sleeve 102 in order to re-engage spherical end 160 with seat 98 and close communication of fluid pressure to the work chamber. Springs 82 and 84 bias the pistons and input assembly to return to their rest positions.

In the event of a failure in the fluid pressure source or in the communication of fluid pressure to the work chamber, the vehicle operator may manually push the input assembly through a distance equal to gaps 138 and 90 so that the wall of groove 132 engages the right side of sleeve 102 and end 75 engages flange 39, the input assembly then moving the primary and secondary pistons to generate fluid pressure for brakes 18 and 20. The cam surface 78 and lever 17 are rendered ineffective by means of spring 83 which has a spring ratio chosen so that spring 83 compresses in the absence of fluid pressure that is normally communicated to chamber 89 and added to the spring force to displace piston 38 during normal power operation.

Figure 3:
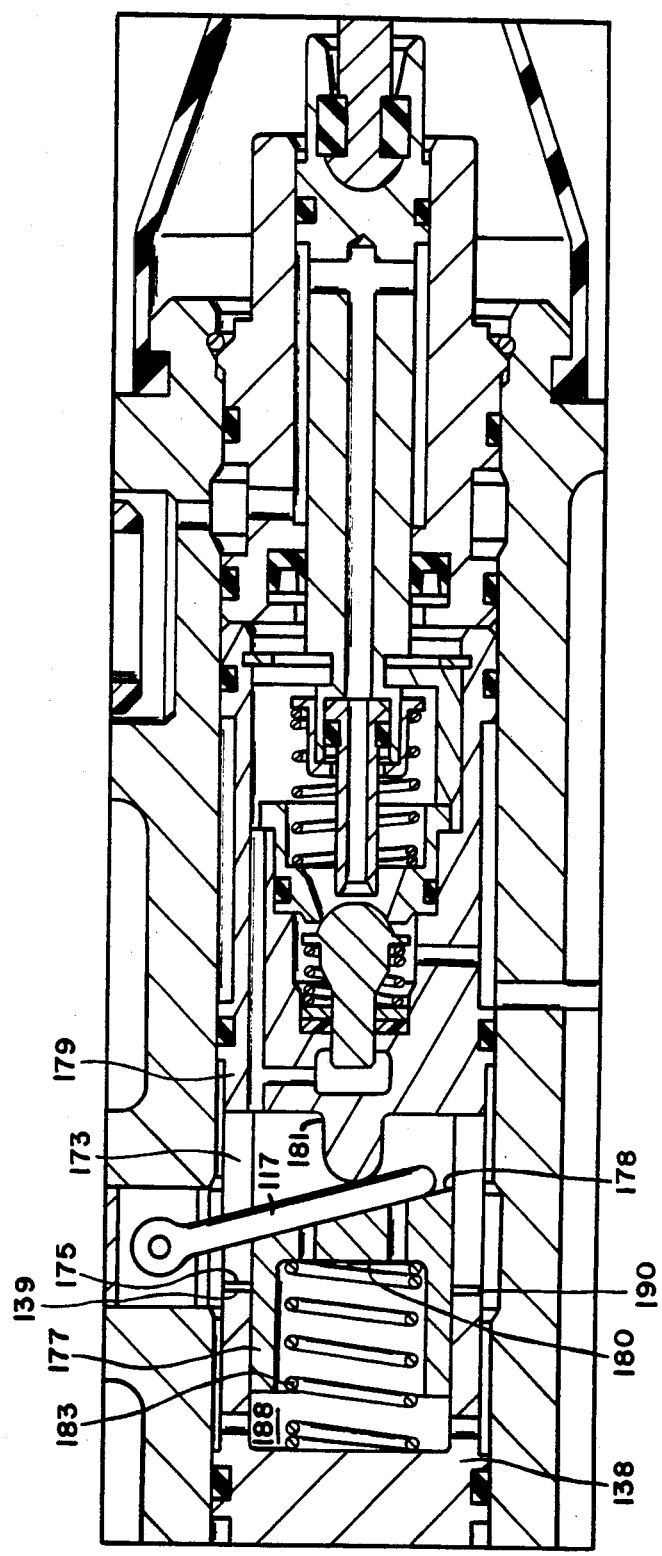
FIG. 3 is an enlarged partial view of an alternative embodiment.

FIG. 3 illustrates an alternative embodiment of the present invention. The cam lever 117 is disposed between a cam actuator part 181 and the cam surface 178. Primary piston 138 includes cavity 188 receiving the cam part 177 therein, with resilient member 183 disposed between an end wall 139 of primary piston 138 and end wall 180 of cam part 177. Cam part 177 is slidably received within cavity 188. The resilient member 183 maintains the gap or distance 190 between primary piston end 139 and valve housing end 175. Valve housing 179 includes a pair of oppositely disposed longitudinal slots 173 receiving therein the cam surface 178 and cam lever 117. The power and no-power operation are identical to the operation discussed above. During power operation, the actuator part 181 biases the lever 117 leftwardly and the lever 117 displaces the cam part 177 and primary piston 138 a greater distance because the lever 117 engages the radially outer portion of the cam surface 178. During manual operation when there is a failure of fluid pressure, the absence of fluid pressure within cavity 188 subtracts from the force exerted against cam part 177 by the fluid pressure and spring 183, so that spring 183 is compressed and the lever 117 rendered ineffective.

The hydraulic brake booster of the present invention provides significant advantages over previous hydraulic brake boosters. First, the hydraulic brake booster accomplishes the desired objectives while utilizing a single bore booster which includes essentially all of the assembly parts within the single bore. The booster housing includes only the radial passage added thereto so that the plug and lever may be inserted therein, the resulting changes in booster housing design, primary piston and valve housing being relatively minor and inexpensive. Second, the brake booster of the present invention provides the desired short travel stroke of the brake pedal which results in a increased or greater travel of the piston by means of the engagement of the lever and cam surface. Thus, most of the "feel" provided by a vacuum booster is achieved also by the present hydraulic brake booster, without requiring other components required for designs which effect a quick take-up of fluid losses in the system. Because of the increased stroke travel of the pistons relative to the input assembly, the take-up of fluid losses is an inherent accomplishment of the present invention and the other components are not required. Third, during manual operation of the brake booster, there is provided to the vehicle operator a longer brake pedal stroke which permits the vehicle operator to accomplish the required brake line pressures and stopping distance with a correspondingly reduced force having to be applied to the brake pedal as compared to force that must be applied to a brake pedal with a short stroke. Thus, the mechanical advantage of a long brake pedal stroke is achieved during manual operation of the brakes. Also, a "full stroke" displacement of the brake pedal provides the vehicle operator with better and improved responsiveness in low pressure ranges. Finally, in the manual mode of operation, there are no stroke losses other than the small distace provided by the sum of gaps 90 and 138.

Many variations of the invention described herein are feasible by one skilled in the art, and as such, are intended to fall within the scope of the appended claims.

I claim:

1. A brake booster having a housing with at least one outlet communicating with a brake, a piston movably disposed within the housing between a pressure chamber and a work chamber, an input assembly to control communication of fluid pressure to the work chamber wherein the fluid pressure biases the piston to move from a rest position to a braking position, a valve assembly operable in reponse to movement of the input assembly, and an inlet formed by the housing to communicate fluid pressure to the valve assembly, characterized in that the brake booster comprises a valve housiing disposed between said piston and input assembly and the valve assembly disposed within the valve housing, the valve housing including an actuator part, the piston includiing a cam, the booster including lever means disposed between the cam and actuator part, a radial passage disposed within the housing of said booster, and the lever means pivotally attached to plug means disposed within said passage, displacement of the input assembly effecting operation of the valve assembly and an increased displacement of the piston by means of the actuator part, lever means and cam.

2. The brake booster in accordance with claim 1, further comprising resilient means disposed between said piston and cam, the resilient means biasing said cam into engagement with said lever means.

3. The brake booster in accordance with claim 2, wherein the piston includes a cavity and said cam slidably extending therein, the resilient means disposed within the cavity between an end wall of the cavity and an end wall of the cam.

4. The brake booster in accordance with claim 3, wherein the valve housing of the brake booster includes a pair of oppositely disposed longitudinal slots, the lever means extending within said slots and engaged on one side by said actuator part.

5. The brake booster in accordance with claim 1, further comprising resilient means disposed between said valve housing and actuator part, the resilient means biasing the actuator part toward said lever means.

6. The brake booster in accordance with claim 5, further comprising an abutment disposed within said valve housing, said resilient means biasing said actuator part into engagement with said abutment.

7. A brake booster having a housing with at least one outlet communicating with a brake, a piston movably disposed within the housing between a pressure chamber and a work chamber, an input assembly to control communication of fluid pressure to the work chamber wherein the fluid pressure biases the piston to move from a rest position to a braking position, a valve assembly operable in response to movement of the input assembly, and an inlet formed by the housing to communicate fluid pressure to the valve assembly, characterized in that the brake booster comprises a valve housing disposed between said piston and input assembly and the valve assembly disposed within the valve housing, the valve housing including an actuator part, the piston including a cam, the booster including lever means disposed between the cam and actuator part, and the valve housing including a pair of oppositely disposed longitudinally extending slots each having a width less than half the circumference of the valve housing, the cam and lever means extending between said slots, displacement of the input assembly effecting operation of the valve assembly and an increased displacement of the piston by means of the actuator part, lever means and cam 8. A brake booster having a housing with at least one outlet communicating with a brake, a piston movably disposed within the housing between a pressure chamber and a work chamber, an input assembly movable within said housing and defining an end of said work chamber, a valve housing disposed between said piston and said input assembly, the valve housing having a valve assembly disposed therein and operable in response to movement of the input assembly to control communication of fluid pressure to the work chamber wherein the fluid pressure biases the piston to move from a rest position to a braking position, the valve assembly including a valve member normally closing fluid communication between a fluid pressure source and the work chamber, the valve housing including an inlet for receiving fluid pressure from said pressure source and communicating the fluid pressure to said valve assembly, the valve housing including an actuator part and the piston including a cam, the booster including lever means extending between the cam and actuator part so that operation of the booster causes by way of the actuator part, lever means, and cam, a greater displacement of the piston than of the valve housing, and a radial passage within the housing of said booster, the lever means pivotally attached to plug means disposed within said passage.

9. The brake booster in accordance with claim 8, further comprising resilient means disposed between said valve housing and actuator part, the resilient means biasing the actuator part toward said lever means.

10. The brake booster in accordance with claim 9, further comprising an abutment disposed within said valve housing, said resilient means biasing said actuator part into engagement with said abutment.

11. The brake booster in accordance with claim 8, wherein the valve housing includes a pair of oppositely disposed longitudinally extending slots, the cam and lever means extending between said slots.

12. The brake booster in accordance with claim 8, further comprising resilient means disposed between said piston and cam, the resilient means biasing said cam into engagement with said lever means.

13. The brake booster in accordance with claim 12, wherein the piston includes a cavity and said cam slidably extending therein, the resilient means disposed within the cavity between an end wall of the cavity and an end wall of the cam.

14. The brake booster in accordance with claim 13, wherein the valve housiing of the brake booster includes a pair of oppositely disposed longitudinally extending slots, the lever means extending between said slots and engaged on one side by said actuator part.

* * * * *